INVENTOR
NEAL G. REDDEMAN

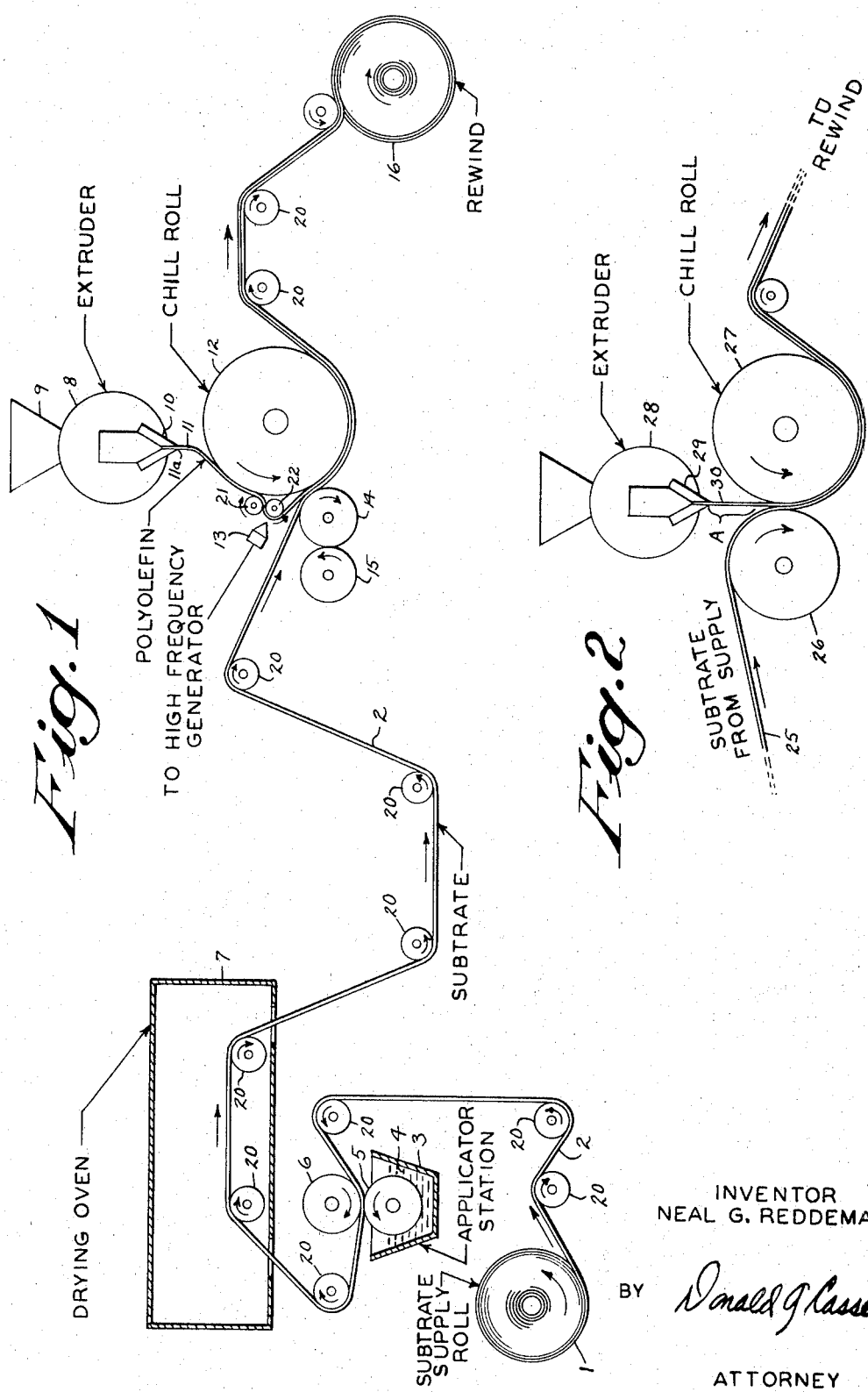

ATTORNEY

United States Patent Office 3,371,002
Patented Feb. 27, 1968

3,371,002
LOW TEMPERATURE POLYOLEFIN EXTRUSION COATING PROCESS
Neal G. Reddeman, Milwaukee, Wis., assignor to Milprint, Inc., Milwaukee, Wis., a corporation of Delaware
Filed July 11, 1962, Ser. No. 209,076
4 Claims. (Cl. 156—244)

This invention relates to the production of polyolefin extrusion coated packaging materials and, more particularly, to the production of polyolefin extrusion coated packaging materials wherein the polyolefin is extruded at substantially lower temperatures than have heretofore been used in this art.

In the packaging field, polyolefin extrusion coated substrates have found fairly substantial use, particularly polyethylene coated paper, paperboard, foil and cellophane, wherein the polyethylene coating is employed principally because of its heat-seal, grease barrier and moisture barrier properties. In the normal polyolefin extrusion coating process (sometimes also referred to as extrusion lamination) employed prior to this invention, the polyolefin material is heated to a viscous fluid in an extruder, extruded as a hot web through a die while at a very high temperature of about 550–600° F. and then brought into contact with the substrate to be coated while it is at a temperature above its normal softening temperature, generally about 300–350° F. These temperature conditions are maintained in the known polyolefin extrusion coating processes in order to obtain satisfactory adhesion of the polyolefin in the substrate. The high die exit temperature of 550–600° F., as in the case of polyethylene, is used so that the extruded web of polyolefin will be oxidized before it contacts the substrate so as to provide adequate adhesion to the substrate. This is required by reason of the fact that polyolefins, such as polyethylene, do not normally contain a sufficient number of polar groups to provide active adhesion sites which will enable them to adhere well to other materials. Therefore, the molten web of polyolefin, in the known extrusion coating processes, leaves the die exit at an oxidizing temperature, i.e. the temperature at which it will be oxidized as it travels through the air between the die and the substrate being coated. The extruded polyolefin is further maintained above its softening temperature when it first contacts the substrate to be coated in order to promote adhesion, particularly with fibrous type substrates wherein adhesion is dependent upon fiber wetting and/or mechanical bonding.

These extrusion temperature conditions used in the known polyolefin extrusion coating processes lead to a polyolefin coated material which possesses a number of highly significant disadvantages in packaging applications. Principal among these disadvantages is the production of off-odors, often referred to by the packaging trade as "oxidized polyethylene odor," brought about by the oxidized polyolegn coating, particularly the oxidized polyolefin exterior surface layers. This off-odor is particularly acute when the olefin coated material is used to package food, since the odors produced by the oxidized polyolefin coating can be absorbed by many articles which may be packaged in the coated material with the oxidized polyolefin exterior surface layers facing the packaged articles. Prior to this time there has been no satisfactory solution to the odor problem caused by known polyolefin extrusion coating techniques. A second disadvantage is that of curling or warping of the substrate onto which the molten polyolefin is extruded caused by shrinkage of the polyolefin as it cools from above its softening temperature down to the ambient temperature. This curling often results in a coated substrate that is unsatisfactory for packaging applications. A third disadvantage of known polyolefin extrusion coating processes is the limitation placed upon the types of substrate materials which can be successfully coated by reason of the high temperature of the extrusion polyolefin when it contacts the substrate. Since this temperature is usually on the order of 300–350° F. the substrate which is being coated must be resistant to these high temperatures, particularly as to its stretchability and melting point if it is to be successfully coated. This feature thus prevents satisfactory polyolefin extrusion coating of many substrate materials which are not resistant to the adverse affects of these high temperatures. A fourth disadvantage of the known polyolefin extrusion processes is that the high temperature at which the polyolefin is extruded often causes thermal degradation of the polyolefin material, such as depolymerization, cross-linking, etc., which in turn can lead to poor heat-sealibility and impairment of the mechanical and/or chemical properties of the polyolefin layer. Another disadvantage is that the necessity to oxidize the extruded polyolefin between the die and the substrate limits the polyolefins which can be successfully extrusion coated to those which have a long enough draw-down portion to be oxidized to the required degree. However, many of the newer polyolefins of the substantially crystalline or stereo-regular types, such as high-density polyethylene and isotactic polypropylene, have such a short draw-down portion when extruded into film that they do not oxidize to a sufficient degree to provide good adhesion. Thus the known extrusion coating techniques preclude the use of these polyolefins, even though they have attractive properties for packaging applications.

The foregoing sets out some of the many problems which have beset polyolefin extrusion coated materials in packaging applications and the use of such materials, although significant even at the present time, is not as extensive as it might be in the packaging art. Consequently, an extrusion coating process which can obviate many of these problems is of substantial importance in the packaging industry and would enable many packagers to obtain the benefits of polyolefin materials without incurring the disadvantages and restrictions now imposed by known extrusion coating techniques.

Accordingly, among the principal objects of this invention are the provision of an improved process for the extrusion coating of polyolefin materials to substrates and the production of improved polyolefin extrusion coated substrates. Other principal objects are to extend the range of substrate materials which can be successfully extrusion coated with polyolefin materials and to extend the range of polyolefin materials which can be successfully extrusion coated.

Another object of this invention is the provision of an improved process for the production of polyolefin extrusion coated substrates wherein the molten polyolefin leaves the die exit at a non-oxidizing temperature, as opposed to the oxidizing temperature now used in the art and which will at the same time provide excellent adhesion of the extruded polyolefin onto the substrate to be coated.

Another object of this invention is to provide an extrusion coating process of the above type wherein the extruded polyolefin is cooled below its softening point prior to the time it is caused to contact and adhere to the substrate material being coated.

Another object of this invention is the provision of polyolefin extrusion coated substrate materials wherein the polyolefin layer is oxidized only at the surface which contacts and adheres to the substrate instead of being oxidized throughout its entire thickness, and the provision of a suitable process for the production of such articles.

Another object of this invention is the provision of a polyolefin extrusion coating process wherein the extrusion takes place at substantially lower temperatures than are presently used and which will thereby extend the range of substrate materials which can be effectively extrusion coated and also reduce thermal degradation of the extruded polyolefin.

Another object of this invention is to extend the range of polyolefin extrusion coating process wherein the extrusion coated through the provision of an extrusion process which does not require the extruded material to be oxidized throughout its draw-down portion in order to be effectively adhered to a substrate, thereby permitting the extrusion coating of polyolefins which have too short a draw-down portion to be successfully coated by known extrusion coating techniques.

Briefly, this invention provides for the extrusion coating of polyolefin materials onto a suitable substrate wherein the polyolefin is extruded at a non-oxidizing temperature instead of an oxidizing temperature as is now used and wherein the extruded polyolefin is below its softening temperature when it contacts the substrate being coated instead of being above its softening temperature as is now common. The surface only of the extruded polyolefin which contacts the substrate is oxidized before it is joined to the substrate in contradistinction to prior art processes wherein the extruded polyolefin is oxidized throughout the entire thickness.

The above-mentioned and other objects will appear in the description. In the description, reference is made to the accompanying drawings which form a part hereof and in which there are shown by way of illustration, two specific forms in which this invention may be practiced. These forms will be described in sufficient detail to enable those skilled in the art to practice this invention, but it is to be understood that other embodiments of the invention may be used and that changes in the embodiments described herein may be made by those skilled in the art without departing from the true scope of the present invention. The scope of the present invention is best defined by the appended claims and the limitations set out in the following description are not to be taken in a limiting sense except insofar as they are incorporated in the claims.

In the drawings:

FIG. 1 is a digrammatic illustration of one form of apparatus suitable for the practice of this invention;

FIG. 2 is a diagrammatic illustration of the extrusion portion of a typical prior art polyolefin extrusion coating process;

Figure 3:
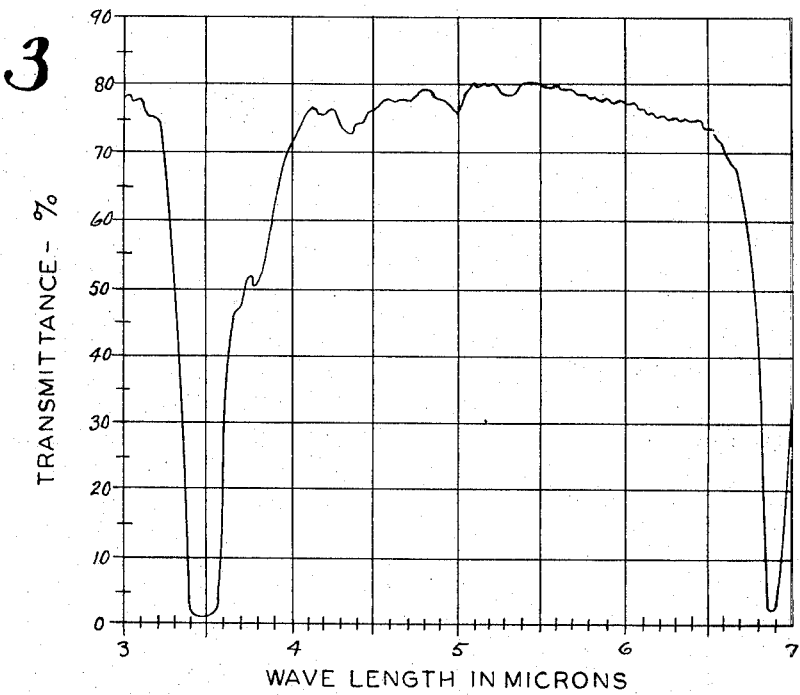
FIG. 3 is a graph depicting a portion of a typical infrared absorption curve of a polyolefin extrusion coating produced according to this invention.

In the apparatus illustrated in FIG. 1, a web of substrate material 2 is withdrawn from a feed supply roll 1 and drawn through an applicator station 3 comprising a bath 4 of suitable polyolefin adhesion-promoting material and coating rollers 5 and 6. The bath 4 and rollers 5 and 6 are intended to depict a gravure type coater with an oscillating doctor blade. From the applicator station 3, the web of substrate passes through a drying oven 7 which incorporates suitable drying and ventilation means, not shown, to dry the polyolefin adhesion-promoting coating applied to the substrate at station 3. From the drying oven 7, the web of substrate 2 passes to the nip of a rotatable chill roll 12 and a rotatable backup roll 14, the backup roll preferably being rubber covered. A cooling roll 15, incorporating a suitable water cooling system, not shown, is employed as indicated to provide for surface cooling of the backup roll 14. The polyolefin material to be extrusion coated onto the substrate is supplied through a hopper 9 into a barrel extruder 8 wherein it is plasticated by heat and mechanical working into a viscous fluid and forced through an extruder die 10 to form a web of polyolefin 11 which is extruded onto the periphery of a chill roll 12. The chill roll 12 employs a suitable water cooling system, not shown, so that it may be maintained at a preselected low temperature. After traveling a short distance about the periphery of the chill roll 12, the web of polyolefin 11 is picked off the periphery of the chill roll 12 and passed between the rollers 21 and 22 and the surface 11a of the web 11 which is to contact the substrate 2 is surface oxidized by being subjected to the influence of an oxidizing corona discharge electrode 13 as it travels about the roller 22. Immediately after its surface is thusly treated, the web of extruded polyolefin is drawn through the nip of the chill roll 12 and backup roll 14 wherein it comes in contact with the coated surface of the web 2 of substrate and is firmly joined thereto, the chill roll 12 and backup roll 14 being positioned so as to supply the pressure required for joining the two webs. The coated material, now comprising a web of substrate 2 and a thin coating of polyolefin 11, is passed about suitable idler rollers onto a rewind roll 16 where it is wound into roll form for further conversion to packaging uses. As indicated in FIG. 1, idler or guide rollers 20 may be incorporated as required to control the travel of the respective webs. Suitable drive mechanisms should be incorporated with the apparatus depicted in FIG. 1 in order to drive the rollers necessary to provide the required transport of the respective webs. Thus, for example, the chill roll 12, rewind roll 16 and coating roller 5 of the applicator station would normally each be driven with a suitable drive mechanism. Such drive mechanisms are well known and will be apparent to those skilled in this art and, therefore, need no further discussion or illustration herein.

At the applicator station 3, the web of substrate is to receive, on at least one of its surfaces, a coating of a polyolefin adhesion-promoting coating that will strengthen the bond between the polyolefin extrusion coating and the substrate. The particular primer or adhesive used as the adhesion-promoting coating forms no part of this invention and there are a variety of suitable coating compounds and/or mixtures which are known in the art and which may be used for this purpose. A typical useful polyolefin adhesion-promoting coating comprises a polyester:urethane mixture wherein the polyester comprises a mixed ester of ethylene glycol and aromatic acids, such as terephthalic acid, and dicarboxylic acids in such molal ratio that there are no residual hydroxyl groups in the polyester chain except at the ends. The urethane may comprise the reaction product of a diisocyanate (e.g. tolylene diisocyanate) and a tri-functional polyol (e.g. trimethylol propane). "Adcote 1076" is an example of a polyester of the foregoing type and "Adcote 1079" and "Mondur CB75" are examples of urethanes of the foregoing type. The adhesion-promoting coating may comprise a mixture of 70% by weight of the polyester component in the form of a 30% solids dispersion in a methyl ethyl ketone-toluene combination, and 30% by weight of the urethane in the form of a 60% solids dispersion in methyl isobutyl ketone. A primer of this type may be applied to the substrate at coating weights of .1 to 1.0 pound of dried solids per ream (3,000 sq. ft.) of substrate surface; within this range, coating weights of about 0.3 to 0.5 pound per ream have proved to be most useful with a variety of polyolefin adhesion-promoting coatings.

As indicated in FIG. 1, the treating electrode 13 is to be connected to a high frequency generator of the type which will produce an electrical corona discharge so as to oxidize the surface 11a of the web of polyolefin. A typical useful generator for this purpose is the model HFSG-2 high frequency generator manufactured by Lepel High Frequency Laboratories, Inc., which develops output power having a frequency of approximately 450 kilocycles on an input current of 1½ kilowatts, 60 cycles at 115 or 230 volts; other suitable high frequency generators are well-known in the art. A treating process of the type which can be used to surface oxidize the web 11 is more fully described and illustrated in U.S. Patent No. 2,939,956 to George J. Parks. In addition to the apparatus shown in the aforesaid patent; there are other forms of apparatus known in the art for producing a surface-oxidizing electrical corona discharge which may be used with the process of this invention. It is also possible to use known flame treatment or chemical treatment techniques to produce the desired surface oxidation, but they are more cumbersome and difficult to use from an operating standpoint than the electrical corona discharge method.

It is in the temperature at which the web of polyolefin is maintained when it exits from the die 10 and when it contacts the substrate that the present invention represents a marked departure from the known polyolefin extrusion coating techniques. This difference will be more appreciated by reference to FIG. 2 which diagrammatically illustrates a typical generally used polyolefin extrusion coating process. In FIG. 2 a web of uncoated substrate 25 is fed into the nip of a pressure roll 26 and chill roll 27. An extruder 28 and its associated die 29 cooperate to form a molten web of polyolefin 30 which is also fed into the nip of the pressure roll 26 and chill roll 27, at which position it is joined to the substrate 25. The associated supply and take-up systems have been omitted from FIG. 2 for the sake of brevity but they may be of any known form well-known in the art. In this prior art form of polyolefin extrusion coating, the polyolefin leaves the die exit at a high oxidizing temperature, generally on the order of 550–600° F. so that it will be oxidized throughout its thickness upon exposure to air as it travels from the die exit to the nip of the pressure roll 26 and chill roll 27, i.e. throughout its draw-down portion "A." In addition, the web of polyolefin is above its softening temperature when it is introduced into the nip of the aforesaid rollers.

Figure 4:
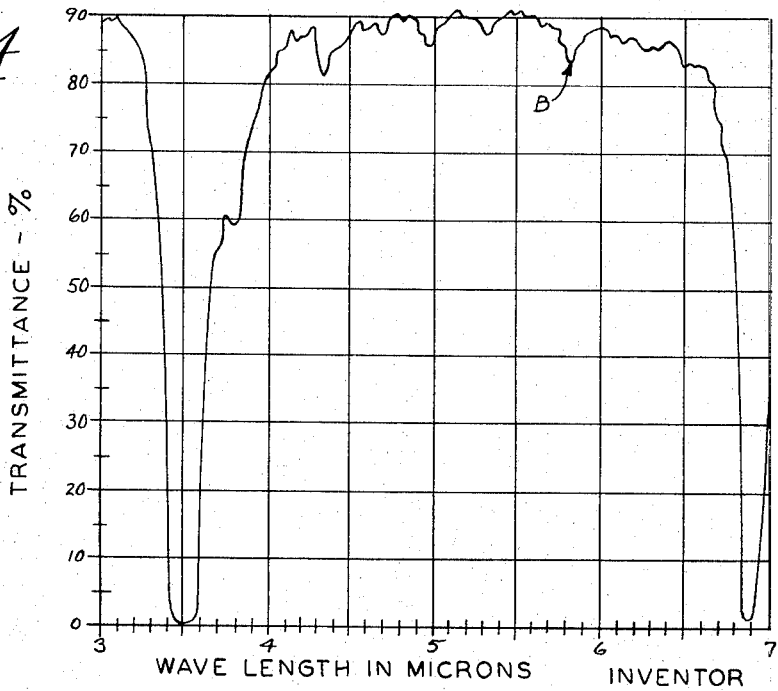
FIG. 4 is a graph depicting a portion of a typical infrared absorption curve of a polyolefin extrusion coating produced according to the prior art methods.
Figure 5:
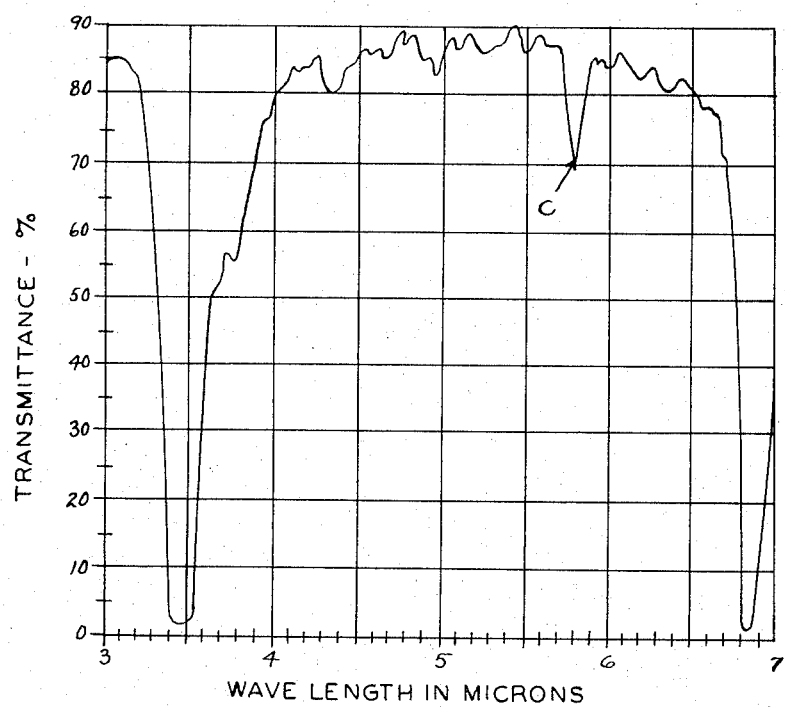
FIG. 5 is a graph depicting a portion of a typical infrared absorption curve of another polyolefin extrusion coating produced according to the prior art methods.

According to this invention, however, the web of polyolefin 11 is exerted at a non-oxidizing temperature and then cooled to a film-forming temperature, i.e. below its softening temperature, on the chill roll before it is joined to the substrate. The term "non-oxidizing temperature" is defined for the purposes of this description and the claims as a temperature at which the extruded polyolefin will not become oxidized throughout its thickness as it travels from the die exit onto the chill roll. This temperature can be controlled by suitably controlling the temperature conditions which exist in the extruder barrel, in the well-known manner. Whether or not a particular polyolefin extrusion coating has been extruded at a non-oxidizing temperature is best determined from infrared absorption analysis of the extruded polyolefin coating itself. In has been established that the major effect of heat oxidation in air on the molecular structure of polyolefin materials is the formation of ketonic carbonyl groups, see the paper presented by J. C. Luongo at the 1959 Pittsburgh Conference on Analytical Chemistry and Applied Spectroscopy on Mar. 4, 1959, and Billmeyer, Textbook of Polymer Chemistry, page 69, Interscience, 1957. Upon exposure to infrared light energy, such ketonic carbonyl groups exhibit a characteristic absorption at 5.8 microns wavelengths and thus their presence or absence in a polyolefin molecule can be detected by infrared absorption analysis using the following technique. The substrate is removed from a sample of polyolefin extrusion coated material and the surface of the polyolefin layer so removed which contacted the substrate is washed in concentrated sulfuric acid to remove any surface oxidation and/or coating. The polyolefin sample is then rinsed and dried and its infrared absorption spectrum taken with a suitable infrared spectrophotometer. From the infrared spectrum obtained, the absorbance of the sample in the 5.8 micron wavelength range is computed and used as an index of the presence of ketonic carbonyl groups. Absorbance, according to standard definitions, is the log to the base 10 of the reciprocal of transmittance, or $A = \log_{10} 1/T$, wherein transmittance, T, is defined as the ratio of the amount of light energy transmitted by the sample to the amount of light energy incident upon the sample. FIGS. 3, 4 and 5 illustrate the 3 to 7 micron range of the infrared spectra obtained from three different samples of extrusion coated polyethylene analyzed according to the above technique with a Beckman IR–5 spectrophotometer. The sample shown in FIG. 3 was extrusion coated according to this invention and the samples shown in FIGS. 4 and 5 were extrusion coated according to prior art methods. As shown in these curves, the sample of FIG. 3 does not show a "peak" in the 5.8 micron range whereas the samples of FIGS. 4 and 5 both show peaks in this range as designated by the reference letter B in FIG. 4 and C in FIG. 5. Using the above formulae, the absorbance in the 5.8 micron range of the sample shown in FIG. 3 is substantially 0, that for the sample of FIG. 4 is about 0.03 and that for the sample of FIG. 5 is about 0.10. Most polyolefin extrusion coatings produced according to prior art methods will exhibit an absorbance somewhere between that of FIGS. 4 and 5, that is, an absorbance somewhere between 0.03 and 0.10 or greater. As indicated by the curve of FIG. 3, however, the process of this invention can be utilized to produce polyolefin extrusion coated substrates wherein the extruded polyolefin layer has an absorbance of substantially 0 thereby indicating an almost completely unoxidized polyolefin coating excepting, of course, the surface which is in contact with the substrate and which has been surface oxidized by suitable treatment as previously described. It has been found that, for the purpose of having a minimum degree of oxidation off-odor for polyolefin extrusion coated packaging materials, the polyolefin should be extruded at a temperature which will produce an absorbance of less than .03 as determined and calculated according to the foregoing methods. It has further been found that extrusion in the temperature range of about 400–490° F. will provide a non-oxidizing extrusion temperature for most polyolefin materials suitable for the practice of this invention.

In addition to extrusion at a non-oxidizing temperature, this invention departs from prior art polyolefin extrusion coating processes in providing that the extruded polyolefin is to be cooled to a film-forming temperature, i.e. below its softening temperature, by contact with the chill roll before it is joined to the substrate. According to prior art methods, however, the extruded polyolefin is normally joined to the substrate while it is still above its softening temperature.

Figure 6:
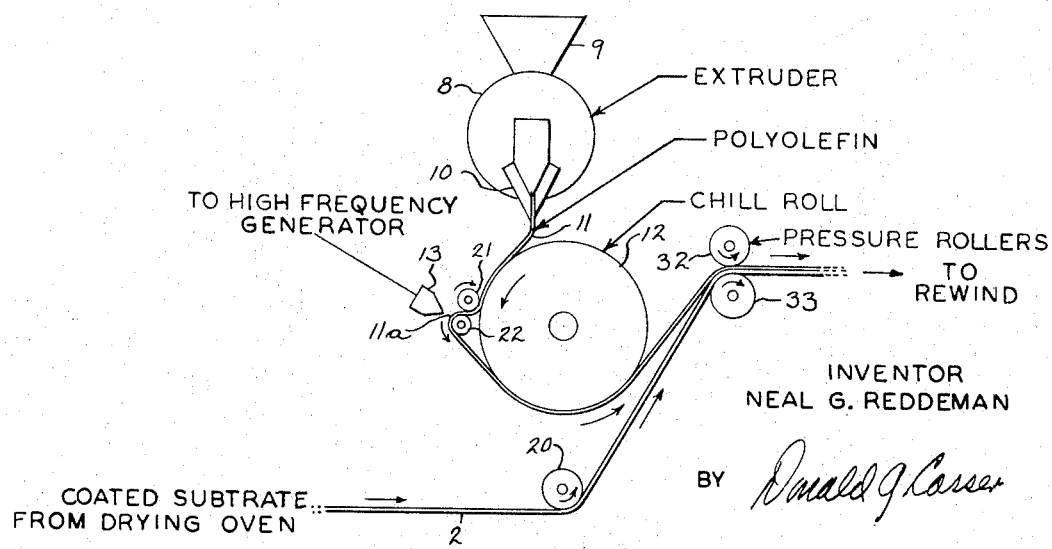
FIG. 6 is a diagrammatic illustration of a second form of apparatus suitable for the practice of this invention.

As shown in FIG. 1, the web of polyolefin 11 is joined to the web of substrate 2 as the two webs are advanced through the nip of the chill roll 12 and the backup roll 14. An alternate form of apparatus for joining the extruded polyolefin to the substarte is illustrated in FIG. 6 (wherein like reference numerals refer to the same parts as FIG. 1) in which the web 11 of polyolefin is joined to a moving web of substrate 2 after the web of polyolefin has left the chill roll 12. In this apparatus, the web of polyolefin passes about the chill roll periphery and is fed through the nip of pressure rollers 32 and 33 and the moving web of substrate passes about the idler roll 20 and through the nip of pressure rollers 32 and 33. As the two webs pass through the pressure rollers, they become firmly joined to one another to produce a polyolefin extrusion coated substrate. The substrate in FIG. 6 is to recieve a coating of polyolefin adhesion-promoting material prior to the time it reaches the pressure rollers. The supply, applicator, drying and rewind stations can be the same as illustrated in FIG. 1 and they have therefore been omitted from FIG. 6 In either apparatus, the substrate and polyolefin should be joined together immediately after the polyolefin is surface oxidized in order to prevent loss of or decrease in the oxidation treatment given to the surface 11a of the polyolefin which is to contact the substrate so as to secure a firm bond between the polyolefin and the polyolefin and the substrate. Thus the polyolefin is not to be wound into roll-form according to this invention before being joined to the substrate and because of this, its surface 11a may be heavily treated to get good bonding to the substrate since blocking of the treated polyolefin will not be a problem. That is, if the treated polyolefin were wound into a roll the treated surface would stick to an untreated surface of an abutting ply, i. e. "block" and prevent satisfactory unwinding of the roll. However, this is eliminated in this invention since the joining of the polyolefin to the substrate takes place almost immediately after the polyolefin has been extruded and surface oxidized.

Table I lists a number of examples of polyolefin extrusion coated materials which were produced according to this invention. In Examples 1 through 7, low-density used in the known extrusion coating processes. These latter two examples thus demonstrate the increase in the range of the types of polyolefin materials which can be successfully extrusion coated brought about by this invention. It has been found that the partly crystalline polyolefins, such as those of Examples 9 and 10, are most advantageously extruded when the extruder is equipped with a die that has angle lips which are adapted to deliver the extruded polyolefin web substantially tangentially to the periphery of the chill roll. Further, the Saran substrate of Example 7 and the oriented polypropylene substrate of Example 10 are quite heat-sensitive and extrusion coating of these substrates by the known processes would have produced a coated material which had such a high degree of curl as to be an unsalable or useless product in the packaging field. However, as stated previously, these two substrates were successfully coated according to this invention and the coated materials embodying these substrates did not show any unsatisfactory curl. These two examples demonstrate the extension in the types of substrates which can be successfully extrusion coated that is made possible by this invention.

TABLE I

| Ex. | Substrate | | Polyolefin Extrusion Coating | | Extrusion Temp., °F. |
| --- | --- | --- | --- | --- | --- |
| | Type | Gauge | Type | Gauge | |
| 1 | Polyethylene terephthalate film (Mylar) | .0005 | Low density polyethylene, melt index=6.0 | .002 | 485 |
| 2 | MAD 10 cellophane | 300 | ....do.... | .002 | 485 |
| 3 | Linear (or high density) polyethylene | .0009 | ....do.... | .002 | 485 |
| 4 | Laminate of foil and paper .0035 foil on 25# sulfite | | ....do.... | .002 | 485 |
| 5 | Laminate of Saran and cellophane, 300 gauge MAD 10 cellophane and 50 gauge Saran. | | Low density polyethylene, melt index =7.0 | .002 | 485 |
| 6 | Nylon | .00075 | Low density polyethylene, mlet index=2.0 | .002 | 480 |
| 7 | Saran | .00075 | ....do.... | .002 | 480 |
| 8 | Polyethylene terephthalate film (Mylar) | .005 | Medium density polyethylene | .002 | 485 |
| 9 | Paper | 30# | High density polyethylene | .002 | 480 |
| 10 | Oriented polypropylene | .0005 | Isotactic polypropylene | .002 | 490 |

MAD 10 is a du Pont designation for a coating grade of cellophane.

polyethylenes were extrusion coated onto a number of different types of substrates; as indicated in the table, polyethylenes of varying melt indices were used, including those with a high melt index (Examples 1–5) and those with a low melt index (Examples 6–7). In Example 8, a medium density polyethylene was extrusion coated onto a polyethylene terephthalate (Mylar) substrate. High density (or linear) polyethylene was extrusion coated onto a paper substrate in Example 9 and isotactic polypropylene was extrusion coated onto an oriented polypropylene substrate in Example 10. In all examples, the polyester:urethane mixture described above was applied to the substrate as a polyolefin adhesion-promoting coating.

As indicated in Table I, the polyolefin coatings of Examples 1–10 were extruded in a temperature range of 480–490° F., which, for the polyolefins used, was a non-oxidizing temperature as required by this invention. All of the polyolefin extrusion coated materials of Examples 1–10 were of excellent quality and exhibited the following characteristics: the polyolefin coating was strongly bonded to the substrate, they showed either no curl or an insignificant degree of curl, they exhibited either no detectable off-odor ("oxidized polyethylene odor") or a greatly reduced degree of such off-odor as compared to what would have been produced under the usual extrusion coating processes, and all materials had excellent heat-seal characteristics. It is important to note that the materials shown in Examples 1 through 8 could not have been successfully produced by the known polyolefin extrusion coating process at the extrusion temperature shown but, instead, the normal extrusion coating processes would have required an extrusion temperature of at least about 100° higher to oxidize the polyolefin throughout its thickness as has been previously pointed out herein. The materials of Examples 9 and 10 could not have been produced by the generally known polyolefin extrusion processes since the coatings of these examples are indicative of the type of polyolefin materials which have too short a draw-down portion to be The term "polyolefin material," or its equivalent, as used herein and in the claims is defined as meaning high molecular weight homopolymers prepared from polymerizable aliphatic 1-olefins (such as ethylene and propylene), including branched-chain aliphatic 1-olefins of this type, and interpolymers (including copolymers) of polymerizable aliphatic 1-olefins and one or more copolymerizable compounds containing a

radical wherein the 1-olefin compound is the major (i.e. over 50%) ingredient. Such materials may be prepared by suitable catalytic techniques, a number of which are known in the art, and there are many polyolefins of this type commercially available. U.S. Patent No. 3,024,227 describes a process suitable for polymerizing a large number of olefins and there are many other patents that disclose suitable olefin polymerization methods.

From the foregoing description, it can be seen that the extrusion process of this invention exhibits several operating conditions which differ from prior art polyolefin extrusion coating processes and which lead to packaging materials having a number of major advantages not heretofore available to the packaging art. First, according to the prior art processes, the polyolefin is extruded at a high oxidizing temperature so that the polyolefin coating applied to the substrate will be oxidized throughout its thickness upon exposure to air, whereas, according to the present invention, the polyolefin material to be applied to the substrate is extruded at a non-oxidizing temperature and only the surface which is to contact the web is oxidized. This difference enables the process of this invention to exhibit two important advantages over the prior art extrusion coating techniques. The reduced degree of oxidation of the polyolefin coating according to this invention results in polyolefin extrusion coating packaging materials which have a very substantially and detectably reduced off-odor as compared to extrusion coating packaging materials produced by the prior art processes, thereby extending the range of articles that may be packaged in polyolefin extrusion coated substrates and, hence, enhancing the usefulness of such materials in the packaging field. A second advantage brought about by this difference in extrusion temperatures is that because there is no need for the extruded polyolefin to be oxidized after it exits the extruder die, those polyolefin materials which have a very short draw-down distance can be successfully extrusion coated according to this invention whereas they may not be successfully extrusion coated according to prior art methods. That is, according to the prior art methods, only those materials which exhibit a relatively long draw-down portion during extrusion can be oxidized to an extent sufficient to provide good adhesion to the substrate and thus many of the newer polyolefins, particularly the linear or substantially crystalline polyolefins such as high-density polyethylene and isotactic polypropylene, have too short a draw-down distance to enable them to be successfully extrusion coated according to previously known techniques. A second important feature of the present process is that the polyolefin web is cooled to a film-forming temperature prior to the time it contacts the substrate web in comparison to the prior art techniques wherein the extruded polyolefin is still in a molten condition when it contacts the substrate. This distinction also has a twofold effect on the quality of the coated product: first, it reduces the amount of curling or warping of the substrate because there is less shrinkage of the polyolefin after it contacts the substrate since it is cooled through a narrowed temperature range and, second, the types of substrate materials which can be effectively polyolefin extrusion coated is increased since the substrate material is subjected to lower temperatures than in prior art processes. Another feature of this invention is that extrusion of the polyolefin at the lower temperatures called for by the present process reduces the amount of thermal degradation and breakdown of the polyolefin material as it is extruded as compared to the often substantial degree of undesired thermal degradation caused by the high temperature of the web of polyolefin as it leaves the die in the usual known extrusion coating process, which may be on the order of 550–600° F. It has been found that the lower temperatures used in the extrusion process of this invention produces an extrusion coated polyolefin material that exhibits better heat-sealing properties than the polyolefin extrusion coated materials of the prior art. Thus the materials produced according to the process of this invention can heat-seal at lower temperatures, for any given resin, than those produced according to prior art techniques. This, in turn, means that a packaging machine using materials produced according to the present invention does not have to run as hot in the sealing section which not only leads to improved heat-seals but, in some instances, may also permit a machine to run at faster speeds, particularly those machines wherein the heater output for heat-sealing is a limiting factor. Thus it can be seen that the process of this invention, in many significant respects, leads to polyolefin extrusion coated packaging materials which have a number of highly improved properties that are of great importance to a packager. The packaging materials of this invention can be used for numerous packaging purposes, such as overwraps, pouches and bags, wherein their barrier and heat-seal properties can be utilized.

I claim:

1. In the process for the production of polyolefin extrusion coated packaging materials wherein polyolefin material is heated in an extruder and forced through a die for coating directly onto a substrate, the improvement comprising the steps of:
   (1) advancing a web of substrate material to be extrusion coated with polyolefin through an applicator station wherein a polyolefin adhesion-promoting coating is applied to at least one surface of the advancing web of substrate;
   (2) advancing said web of substrate through a drying station to dry the aforesaid coating;
   (3) advancing said web of substrate through the nip of a rotating polyolefin extrusion chill roll and a backup roll;
   (4) extruding a web of polyolefin material through a die onto the periphery of the aforesaid chill roll, said polyolefin being extruded at a non-oxidizing temperature above its softening temperature;
   (5) cooling said extruded polyolefin to a film-forming temperature on the periphery of said chill roll;
   (6) oxidizing a surface only of said extruded web of polyolefin by subjecting the surface to corona discharge treatment; and
   (7) advancing said extruded web of polyolefin through said nip of the rotating chill roll and the backup roll so that its oxidized surface contacts the coated surface of the advancing web of substrate and the extruded polyolefin is firmly joined to said surface of a substrate upon movement of the two webs through the nip of said rolls.

2. The extrusion coating process of claim 1 wherein the polyolefin is extruded at a non-oxidizing temperature such that it exhibits an infrared absorbance of less than 0.03 in the 5.8 micron wavelength range, exclusive of the surface oxidation on its surface that contacts the substrate.

3. In the process for the production of polyolefin extrusion coated packaging materials wherein polyolefin material is heated in an extruder and forced through a die for coating directly onto a substrate, the improvement comprising the steps of:
   (1) providing an advancing web of substrate material to be extrusion coated with polyolefin;
   (2) applying a polyolefin adhesion-promoting coating to at least one surface the the advancing web of substrate;
   (3) extruding a web of polyolefin through the die onto the periphery of a rotating chill roll, said polyolefin being extruded at a non-oxidizing temperature above its softening temperature;
   (4) cooling said extruded polyolefin to a film-forming temperature on the periphery of said chill roll;
   (5) oxidizing a surface only of said extruded web of polyolefin by subjecting the surface to corona discharge treatment; and
   (6) joining the extruded web of polyolefin to said web of advancing substrate with the oxidized surface of the polyolefin in contact with the coated surface of the substrate to thereby produce a polyolefin extrusion coated substrate.

4. The extrusion coating process of claim 3 wherein the polyolefin is extruded at a non-oxidizing temperature such that it exhibits an infrared absorbance of less than 0.03 in the 5.8 micron wavelength range, exclusive of the surface oxidation on its surface that contacts the substrate.

References Cited

UNITED STATES PATENTS

| | | | |
|---|---|---|---|
| 3,165,432 | 1/1965 | Plaskett | 156—244 |
| 3,077,428 | 2/1963 | Henser et al. | 156—244 |
| 3,230,135 | 1/1966 | Hurst | 156—244 |
| 2,939,956 | 6/1960 | Parks | 204—169 |
| 2,968,576 | 1/1961 | Keller et al. | |
| 3,017,302 | 1/1962 | Hultkrans | 156—244 |
| 3,033,707 | 5/1962 | Lacy et al. | 117—76 |
| 3,165,432 | 1/1965 | Plaskett | 156—244 |

OTHER REFERENCES

Phelps et al., "Oxidation in Extrusion," published in Plastics Technology for March 1960, pps. 31–33.

EARL M. BERGERT, *Primary Examiner.*

ALEXANDER WYMAN, *Examiner.*

R. J. ROCHE, *Assistant Examiner.*

UNITED STATES PATENT OFFICE
CERTIFICATE OF CORRECTION

Patent No. 3,371,002                                February 27, 1968

Neal G. Reddeman

It is hereby certified that error appears in the above numbered patent requiring correction and that the said Letters Patent should read as corrected below.

Column 1, line 57, for "polyolegn" read -- polyolefin --; column 2, line 28, for "as" read -- a --; column 3, lines 9 and 10, strike out "extrusion coating process wherein the extrusion coated" and insert instead -- materials which can be successfully extrusion coated --; line 28, for "the" read -- its --; column 5, line 42, for "exerted" read -- extruded --; line 56, for "In" read -- It --; line 65, for "wavelengths" read -- wavelength --; column 6, line 5, after "of", second occurrence, insert -- the --; line 72, for "recieve" read -- receive --; column 7, line 7, strike out "and the polyolefin"; line 66, for "process" read -- processes --; column 10, line 36, for "the the" read -- of the --.

Signed and sealed this 17th day of June 1969.

(SEAL)
Attest:

EDWARD M. FLETCHER, JR.                    WILLIAM E. SCHUYLER, JR.
Attesting Officer                              Commissioner of Patents